(12) United States Patent
Yoo et al.

(10) Patent No.: US 9,963,602 B2
(45) Date of Patent: May 8, 2018

(54) ULTRAVIOLET CURABLE WHITE INK COMPOSITION FOR INKJET PRINTING, METHOD FOR PREPARING WHITE BEZEL PATTERN USING SAME, AND ELECTRONIC DEVICE COMPRISING WHITE BEZEL PATTERN PREPARED BY SAME

(71) Applicant: LG CHEM, LTD., Seoul (KR)

(72) Inventors: Jae-Hyun Yoo, Daejeon (KR);
Kook-Hyun Choi, Daejeon (KR);
Joon-Hyung Kim, Daejeon (KR);
Mi-Kyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days. days.

(21) Appl. No.: 15/515,847

(22) PCT Filed: Nov. 13, 2015

(86) PCT No.: PCT/KR2015/012226
§ 371 (c)(1),
(2) Date: Mar. 30, 2017

(87) PCT Pub. No.: WO2016/076662
PCT Pub. Date: May 19, 2016

(65) Prior Publication Data
US 2017/0321073 A1   Nov. 9, 2017

(30) Foreign Application Priority Data

Nov. 13, 2014 (KR) .................. 10-2014-0157958
Nov. 11, 2015 (KR) .................. 10-2015-0158378

(51) Int. Cl.
| | | |
|---|---|---|
| *G01D 11/00* | (2006.01) |
| *C09D 11/00* | (2014.01) |
| *C09D 11/101* | (2014.01) |
| *C09D 11/102* | (2014.01) |
| *C09D 11/322* | (2014.01) |
| *C09D 11/38* | (2014.01) |
| *B41J 11/00* | (2006.01) |
| *B41J 3/407* | (2006.01) |
| *B41M 3/00* | (2006.01) |

(52) U.S. Cl.
CPC ............. *C09D 11/101* (2013.01); *B41J 3/407* (2013.01); *B41J 11/002* (2013.01); *B41M 3/00* (2013.01); *C09D 11/102* (2013.01); *C09D 11/322* (2013.01); *C09D 11/38* (2013.01)

(58) Field of Classification Search
CPC ...... C09D 11/101; C09D 11/102; B41J 3/407; B41J 11/002
USPC .......................... 347/97, 100, 102; 106/31.13
See application file for complete search history.

(56) References Cited

U.S. PATENT DOCUMENTS

| | | | | |
|---|---|---|---|---|
| 8,277,698 B2* | 10/2012 | Kim | ...................... | C09D 11/10 106/31.46 |
| 9,526,166 B2* | 12/2016 | Jin | ...................... | H04M 1/0266 |
| 2017/0198157 A1* | 7/2017 | Park | ...................... | B41M 7/00 |

FOREIGN PATENT DOCUMENTS

| | | |
|---|---|---|
| JP | 2008-308692 A | 12/2008 |
| KR | 10-2010-0039652 A | 4/2010 |
| KR | 10-2013-0056598 A | 5/2013 |
| KR | 10-2014-0009035 A | 1/2014 |
| KR | 10-2014-0086584 A | 7/2014 |
| KR | 10-2014-0098462 A1 | 8/2014 |
| WO | 2014/175440 A1 | 10/2014 |

\* cited by examiner

Primary Examiner — An Do
(74) Attorney, Agent, or Firm — Dentons US LLP

(57) ABSTRACT

The present invention relates to an ultraviolet curable white ink composition for inkjet printing comprising a pigment dispersion, a binder solution, a monofunctional monomer and a photoinitiator and, more particularly, to an ultraviolet curable white ink composition for inkjet printing which, at the time of forming a pattern, has a thickness of 30 μm or less and a contrast ratio of 98% or more, a method for preparing a white bezel pattern using the same, and an electronic device comprising the white bezel pattern prepared by the method.

20 Claims, No Drawings

ULTRAVIOLET CURABLE WHITE INK COMPOSITION FOR INKJET PRINTING, METHOD FOR PREPARING WHITE BEZEL PATTERN USING SAME, AND ELECTRONIC DEVICE COMPRISING WHITE BEZEL PATTERN PREPARED BY SAME

TECHNICAL FIELD

This application is a National Stage Entry of International Application No. PCT/KR2015/012226, filed on Nov. 13, 2015, and claims the benefit of Korean Application No. 10-2014-0157958, filed on Nov. 13, 2014, and Korean Application No. 10-2015-0158378 filed on Nov. 11, 2015, all of which are hereby incorporated by reference in their entirety for all purposes as if fully set forth herein.

The present invention relates to an ultraviolet curable white ink composition for inkjet printing, a method for preparing a white bezel pattern using the same, and an electronic device comprising the white bezel pattern prepared by the method and, more particularly, to an ultraviolet curable white ink composition for inkjet printing, which increases the thickness and the contrast ratio, does not cause a yellowing even under a high-temperature heat treatment, and may exhibit improved adhesion strength, a method for preparing a white bezel pattern using the same, and an electronic device comprising the white bezel pattern prepared by the method.

BACKGROUND ART

In the case of a white bezel, the bezel has to be printed in a thickness level of 30 μm in order to have a hiding power due to the pigment characteristics, and most of the existing white bezels have secured hiding power and light-shielding characteristics by performing a white quadruple color printing (7 μm for every single tone printing) and a black or gray single tone printing (7 μm) by a screen printing method. However, a curing process (oven—160° C., 10 minutes) is included for every single tone printing, so that there is a disadvantage in that the process is complicated, and it takes a lot of time. In order to solve the problems, there is a need for developing an ultraviolet curable white ink for inkjet, which is capable of achieving a process simplification and shortening time by printing a white bezel at a time and ultraviolet curing the white bezel.

The white bezel requires a surface hardness of 5H, an adhesion strength of 5B, a contrast ratio of 98% or more, a color value (L*>90, a*<±1, and b*<±1), high temperature (200° C.) heat resistance, and chemical resistance for a base material. Further, an ultraviolet curable white ink for a touch screen panel bezel has to be applied to not only reinforced glass, but also various base materials, has to have excellent jetting performance as an ink for inkjet, and has to exhibit excellent bezel performance without a yellowing even after a high-temperature heat treatment is performed. In particular, since a bezel is printed and an electrode is deposited thereon in a cover glass integral type touch panel, heat resistance has to be secured at a temperature of 200° C. or more.

DISCLOSURE

Technical Problem

In order to solve the problems in the related art, an object of the present invention is to provide an ultraviolet curable white ink composition for inkjet printing which is capable of forming a bezel with a thickness enough to have a hiding power by a one-time process and exhibiting improved adhesion strength without producing a yellowing even when a high-temperature heat treatment is performed, a method for preparing a white bezel pattern using the same, and an electronic device comprising the white bezel pattern prepared by the method.

Technical Solution

In order to solve the problem, the present invention provides an ultraviolet curable white ink composition for inkjet printing comprising a pigment dispersion, a binder solution, a monofunctional monomer, and a photoinitiator, in which the ultraviolet curable white ink composition for inkjet printing has, at the time of forming a pattern, a thickness of 30 μm or less and a contrast ratio of 98% or more.

The present invention provides a method for preparing a white bezel pattern using an ultraviolet curable white ink composition for inkjet printing, the method comprising: a) preparing a substrate on which a white bezel is formed by inkjet printing an ultraviolet curable white ink composition for inkjet printing of the present invention to have a thickness of 30 μm or less on a substrate; b) forming a cured white bezel pattern by irradiating an ultraviolet ray of 1,000 mJ/cm$^2$ or more onto the substrate; and c) heat-treating the substrate.

Further, the present invention provides a white bezel pattern prepared by the preparation method.

In addition, the present invention provides an electronic device comprising the white bezel pattern.

Advantageous Effects

According to the present invention, a white bezel pattern having a thickness of 30 μm or less and a contrast ratio of 98% or more may be prepared in a one-time printing by adjusting the content of a pigment included in an ink composition within a range which can be applied by an ink for inkjet printing.

The white bezel pattern prepared by the present invention does not produce a yellowing even after a high-temperature heat treatment (220° C., 30 minutes) is performed, and may exhibit improved adhesion strength.

BEST MODE

Hereinafter, the present invention will be described in more detail.

An ultraviolet curable white ink composition for inkjet printing according to the present invention includes a pigment dispersion, a binder solution, a monofunctional monomer, and a photoinitiator, and has a thickness of 30 μm or less and a contrast ratio of 98% or more at the time of forming a pattern.

The pigment dispersion included in the ultraviolet curable white ink composition for inkjet printing of the present invention may include a white pigment, a first reactive monomer, and a dispersing agent.

As the white pigment, titanium dioxide ($TiO_2$), zinc oxide, and the like may be used, and the white pigment serves to increase the reflectance, and thus impart a hiding power to a pattern formed of the composition.

It is preferred that the ink composition of the present invention includes the white pigment in an amount of 55 to 70 wt % based on the total weight of the pigment dispersion. When the content of the white pigment is less than 55 wt %, the hiding characteristics are insufficient, and when the content is more than 70 wt %, it is difficult to disperse the ink composition of the present invention.

As the first reactive monomer, a trifunctional acrylate-based monomer and a bifunctional acrylate-based monomer may be used.

As the trifunctional acrylate-based monomer, trimethylolpropane triacrylate (TMPTA), pentaerythritol triacrylate, trimethylenepropane triacrylate, pentaerythritol triacrylate, trimethylene propyl triacrylate, propoxylated glycerol triacrylate, and the like may be used either alone or in a mixture thereof.

It is preferred that as the bifunctional acrylate-based monomer, 1,6-hexanediol diacrylate (HDDA), neopentylglycol diacrylate (NPGDA), dipropylene glycol diacrylate (DPGDA), tripropylene glycol diacrylate (TPGDA), and the like may be used either alone or in a mixture thereof.

It is preferred that the first reactive monomer is included in an amount of 30 to 50 wt % based on the total weight of the pigment dispersion.

As the dispersing agent, a polymer-type, a non-ionic, an anionic, or a cationic dispersing agent may be used, and examples thereof include polyalkylene glycol and esters thereof, polyoxyalkylene polyhydric alcohol, ester alkylene oxide addition products, alcohol alkylene oxide addition products, sulfonic acid esters, sulfonic acid salts, carboxylic acid esters, carboxylic acid salts, alkyl amide alkylene oxide addition products, or alkyl amine, and the like. The dispersing agents may be added alone or used in a mixture of two or more thereof.

It is preferred that the dispersing agent is included in an amount of 2 to 6 wt % based on the total weight of the pigment dispersion.

It is preferred that the pigment dispersion is included in an amount of 50 to 70 wt % based on the total weight of the ink composition.

The binder solution included in the ultraviolet white ink composition for inkjet printing of the present invention is composed of an epoxy-based resin and a second reactive monomer.

The epoxy-based resin is included in an amount of 20 to 40 wt % based on the total weight of the binder solution.

The second reactive monomer serves to dilute the binder, and a bifunctional acrylate-based monomer, a monofunctional monomer, or a mixture thereof may be used. As the bifunctional acrylate-based monomer, 1,6-hexanediol diacrylate (HDDA), neopentylglycol diacrylate (NPGDA), dipropylene glycol diacrylate (DPGDA), tripropylene glycol diacrylate (TPGDA), and the like may be used either alone or in a mixture thereof.

It is preferred that as the monofunctional monomer, 2-hydroxyethyl acrylate (2-HEA), isobornyl acrylate (IBOA), phenoxyethyl acrylate (PEA), phenol acrylate, and the like are used either alone or in a mixture thereof.

The second reactive monomer is included in an amount of 60 to 80 wt % based on the total weight of the binder solution.

The binder solution is included in an amount of 1 to 15 wt % based on the total weight of the ink composition. When the content is less than 1 wt %, the adhesion strength between a base material and a printing layer and the film strength are not sufficient, and when the content is more than 15 wt %, the viscosity is so high that it is difficult to carry out an inkjet process.

The monofunctional monomer included in the ultraviolet curable white ink composition for inkjet printing of the present invention serves to improve the adhesion strength between the base material and the printing layer while lowering the viscosity of the ink. As the monofunctional monomer, a monofunctional monomer having a hydroxy functional group may be used, and preferably, it is possible to use one or more monomers selected from the group consisting of 2-hydroxyethyl acrylate (2-HEA), hydroxypropyl acrylate (HPMA), 2-hydroxyethyl methacrylate (2-HEMA), hydroxypropyl methacrylate (HPMA), and 4-hydroxybutyl acrylate (4HBA), and most preferably, a monomer of 2-hydroxyethyl acrylate (2-HEA) may be used.

The monofunctional monomer may be included in an amount of 5 to 25 wt %, more preferably 10 to 20 wt % based on the total weight of the ink composition. When the content of the monofunctional monomer is less than 5 wt %, the adhesion strength is insufficient, and when the content is more than 25 wt %, the content of the pigment is so low that light-shielding characteristics of the film are not sufficient.

The ink composition of the present invention is used in a solvent-free form in which a solvent such as butyl carbitol acetate is not included likewise in the related art in order to enhance the adhesion strength, and as an adhesion strength enhancer, a monofunctional monomer having a hydroxy functional group, for example, an acrylate monomer such as 2-HEA may be included.

The photoinitiator serves to initiate a curing reaction of forming a polymer by reacting a monomer having an unsaturated double bond contained in the ink during the ultraviolet curing-type procedure.

As the photoinitiator in the present invention, a photoinitiator including ethyl-2,4,6 trimethylbenzoylphenyl phosphinate oxide may be used, and specifically, Lucirin® TPO (2,4,6-trimethylbenzoyldiphenylphosphine oxide, manufactured by BASF Corp.), Irgacure 2100, Irgacure 819, and the like may be used. In particular, when Lucirin® TPO is used as the photoinitiator, a yellowing is not produced even after a high-temperature heat treatment (220° C., 30 minutes), and curing and solubility are excellent. It is preferred that the photoinitiator is included in an amount of 1 to 10 wt % based on the total weight of the ink composition. When the content of the photoinitiator is less than 1 wt %, the curing reaction is not sufficient, and when the content is more than 10 wt %, the photoinitiator may not be completely dissolved.

Further, the ink composition of the present invention does not use, as a photoinitiator, Irgacure 907, Irgacure 754, Irgacure 2959, Darocure MBF, Irgacure 184, and the like, which are a photoinitiator exhibiting a yellowing.

The ultraviolet curable white ink composition for inkjet printing of the present invention may further include any one or more selected from the group consisting of an oligomer, a polyfunctional monomer, a polymerization inhibitor, and a surfactant in addition to the aforementioned configuration.

In the ultraviolet curable white ink composition for inkjet printing of the present invention, the polyfunctional monomer or oligomer serves to increase the strength of a film in a printing layer by causing a crosslinking bond through ultraviolet curing.

As the oligomer, it is possible to use an acrylic oligomer including a polyfunctional acrylate (methacrylate), urethane acrylate, polyester acrylate, epoxy acrylate, melamine acrylate, and the like, or a polymer thereof, and the like.

The polyfunctional monomer is preferably, for example, a monomer having 4 to 6 or more functionalities, it is possible to used one or more monomer selected from the group consisting of pentaerythritol tetraacrylate (PETA), dipentaerythritol pentaacrylate (DPPA), dipentaerythritol hexxacrylate (DPHA), and most preferably, dipentaerythritol hexaacrylate (DPHA) may be used.

It is preferred that the oligomer or polyfunctional monomer is included in an amount of 1 to 15 wt % based on the total weight of the ink composition. When the content is less than 1 wt %, the strength of a film is not sufficient, and when the content is more than 15 wt %, the viscosity of the ink is so high that the process cannot be carried out.

The ink composition of the present invention may additionally include the balance of a polymerization inhibitor and a surfactant.

The polymerization inhibitor serves to prevent a curing reaction from occurring while an ink is stored at normal temperature.

As the polymerization inhibitor, it is possible to use one or more selected from mono methyl ether hydroquinone (MEHQ), benzoquinone, catechol, phenothiazine, N-nitrosophenylhydroxyamine, and 2,2,6,6-tetramethylpiperidin-1-oxyl free radical, and derivatives thereof.

The surfactant serves to facilitate jetting by adjusting the surface tension of the ink, and allow the ink to appropriately spread on a glass substrate.

The surfactant is a silicone-based surfactant or a fluorine-based surfactant, and specifically, as the silicone-based surfactant, it is possible to use BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341v344, BYK-345v346, BYK-348, BYK-354, BYK-355, BYK-356, BYK-358, BYK-361, BYK-370, BYK-371, BYK-373, BYK-375, BYK-380, BYK-390 and the like, which are manufactured by BYK-Chemie Co., Ltd., and as the fluorine-based surfactant, it is possible to use F-114, F-177, F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF1132, TF1027SF, TF-1441, TF-1442 and the like, which are manufactured by DaiNippon Ink & Chemicals (DIC), Inc., but the surfactant is not limited thereto.

Since the ultraviolet curable white ink composition for inkjet printing of the present invention includes a monofunctional monomer having a hydroxy functional group, for example, an acrylate monomer such as 2-HEA as an adhesion strength enhancer instead of not including a solvent such as butyl carbitol acetate likewise in the related art in order to enhance the adhesion strength, the ink composition may be used in a solvent-free form.

Further, as the ultraviolet curable white ink composition for inkjet printing of the present invention has the composition as described above, the viscosity is 10 to 50 cP at normal temperature and the viscosity is 5 to 50 cP at 60° C., so that the inkjet processability and storage stability are excellent, and a white bezel pattern having a thickness of 30 µm or less and a contrast ratio of 98% or more may be prepared by adjusting the content of pigment included in the ink composition to a range which may be applied as an ink for inkjet printing.

Further, as the ultraviolet curable white ink composition for inkjet printing of the present invention has the composition as described above, a yellowing is not produced even after a high-temperature heat treatment (200° C., 30 minutes) is carried out, and improved adhesion strength may be exhibited, so that the ink composition is advantageous in forming a bezel.

In addition, the present invention provides a method for preparing a white bezel pattern using an ultraviolet curable white ink composition for inkjet printing, the method comprising: a) preparing a substrate on which a white bezel is formed by inkjet printing an ultraviolet curable white ink composition for inkjet printing of the present invention to have a thickness of 30 µm or less on a substrate; b) forming a cured white bezel pattern by irradiating an ultraviolet ray of 1,000 mJ/cm$^2$ or more onto the substrate; and c) heat-treating the substrate.

Step b) may be a step of irradiating an ultraviolet ray of 1,000 mJ/cm$^2$ or more based on a thickness of 30 µm by using a 395 nm UV LED lamp.

Step c) may be a step of heat-treating the substrate on which the bezel is formed under the conditions of 150 to 180° C. and 10 to 30 minutes after the ultraviolet curing. The heat treatment may be carried out in an oven or a hot plate. Step c) is a step which is added after the ultraviolet curing for the purpose of improving the adhesion strength of a bezel. Step c) may not also be necessary according to the type of substrate (for example, a film). In an exemplary embodiment of the present invention, the adhesion strength of a bezel pattern may be improved to a level of 5B by carrying out a heat treatment process after the ultraviolet curing.

Further, the present invention provides a white bezel pattern prepared by the preparation method.

The white bezel pattern may exhibit physical properties such as a contrast ratio of 98% or more, a surface hardness of 5H or more, an adhesion strength of 5B, and a color value (L*>90, a*<±1, and b*<±1) in a thickness of 30 µm or less.

In addition, the present invention provides an electronic device comprising the above-described white bezel pattern. The electronic device may be a liquid crystal display device, a display, a touch panel, and the like, but is not limited thereto, and a touch panel is preferred. This is because a pattern for a touch panel is very simple as compared to a black matrix pattern for a liquid crystal display device, and thus may be easily formed through an inkjet printing process.

The electronic device according to the present invention may have a configuration known in the art except for including the above-described pattern according to the present invention.

MODE FOR INVENTION

Hereinafter, the present invention will be described in more detail through Examples and Comparative Examples. However, the following Examples and Comparative Examples are provided for exemplifying the present specification, and the scope of the present specification is not limited thereby.

Examples

An ink composition was mixed as in the composition shown in the following Table 1 and Table 2, and the ultraviolet curable white ink compositions of Examples 1 to 3 and Comparative Examples 1 to 8 were prepared by stirring the mixture for 5 hours.

TABLE 1

| (Each value is given based on a wt %) | | | Example 1 | Example 2 | Example 3 | Comparative Example 1 | Comparative Example 2 | Comparative Example 3 |
|---|---|---|---|---|---|---|---|---|
| Pigment dispersion | Pigment | TiO$_2$ | 36 | 36 | 36 | 30 | 36 | 36 |
| | Dispersing agent | 870 | 1.8 | 1.8 | 1.8 | 1.5 | 1.8 | 1.8 |
| | Monomer | HDDA | 22.2 | 22.2 | 22.2 | 18.5 | 17.2 | 22.2 |
| | Solvent | BCA | — | — | — | — | 5 | — |
| Oligomer/Polyfunctional monomer | | DPHA | 10 | — | 10 | 10 | 10 | 10 |
| | | Oligomer | — | 10 | — | — | — | — |
| Bifunctional monomer | | HPNDA | — | — | — | 10 | — | 19.9 |
| Monofunctional monomer | | 2-HEA | 19.9 | 19.9 | 19.9 | 19.9 | 19.9 | — |
| Epoxy resin | | PD7610 | 2 | 2 | 2 | 2 | 2 | 2 |
| Adhesion strength enhancer | | KBM-403 | 3 | 3 | 3 | 3 | 3 | 3 |
| | | KBM-503 | — | — | — | — | — | — |
| Photoinitiator | | TPO | 5 | 5 | — | 5 | 5 | 5 |
| | | I 2100 | — | — | 5 | — | — | — |
| | | I 184 | — | — | — | — | — | — |
| | | I 907 | — | — | — | — | — | — |
| Surfactant | | BYK307 | 0.05 | 0.05 | 0.05 | 0.05 | 0.05 | 0.05 |
| Polymerization inhibitor | | MEHQ | 0.05 | 0.05 | 0.05 | 0.05 | 0.05 | 0.05 |
| Total | | | 100 | 100 | 100 | 100 | 100 | 100 |

Table 2

TABLE 2

| (Each value is given based on a wt %) | | | Comparative Example 4 | Comparative Example 5 | Comparative Example 6 | Comparative Example 7 | Comparative Example 8 |
|---|---|---|---|---|---|---|---|
| Pigment dispersion | Pigment | TiO$_2$ | 36 | 36 | 36 | 36 | 36 |
| | Dispersing agent | 870 | 1.8 | 1.8 | 1.8 | 1.8 | 1.8 |
| | Monomer | HDDA | 22.2 | 22.2 | 22.2 | 22.2 | 22.2 |
| | Solvent | BCA | — | — | — | — | — |
| Oligomer/Polyfunctional monomer | | DPHA | 10 | 10 | 10 | 10 | 10 |
| | | Oligomer | — | — | — | — | — |
| Bifunctional monomer | | HPNDA | 16.9 | — | — | — | — |
| Monofunctional monomer | | 2-HEA | 3 | 21.9 | 19.9 | 19.9 | 19.9 |
| Epoxy resin | | PD7610 | 2 | 0 | 2 | 2 | 2 |
| Adhesion strength enhancer | | KBM-403 | 3 | 3 | — | 3 | 3 |
| | | KBM-503 | — | — | 3 | — | — |
| Photoinitiator | | TPO | 5 | 5 | 5 | — | — |
| | | I 2100 | — | — | — | — | — |
| | | I 184 | — | — | — | 5 | — |
| | | I 907 | — | — | — | — | 5 |
| Surfactant | | BYK307 | 0.05 | 0.05 | 0.05 | 0.05 | 0.05 |
| Polymerization inhibitor | | MEHQ | 0.05 | 0.05 | 0.05 | 0.05 | 0.05 |
| Total | | | 100 | 100 | 100 | 100 | 100 |

870: Hybridur ® (manufactured by Air Products Co., Ltd.)
HDDA: 1,6-hexanediol diacrylate
BCA: butyl carbitol acetate
DPHA: dipentaerythritol hexaacrylate
Oligomer: Cresol novolac epoxy oligomer SC6400 (manufactured by Miwon Specialty Chemical Co., Ltd.)
HPNDA: Hydroxy Piperidinoic Acid Ester neopentyl Glycol Diacrylate
2-HEA: 2-hydroxyethyl acrylate
PD7610: Epoxy resin (manufactured by Anderson Development Company)
KBM-403: manufactured by Shin-Etsu Co., Ltd.
KBM-503: manufactured by Shin-Etsu Co., Ltd.
TPO: Lucirin ® TPO
I 2100: Irgacure 2100 (manufactured by BASF Corp.)
I 184: Irgacure 184 (manufactured by BASF Corp.)
I 907: Irgacure 907 (manufactured by BASF Corp.)
BYK307: (manufactured by Byk Chemie)
MEHQ: Mono Methyl Ether Hydroquinone <Evaluation of Surface Hardness and Adhesion Strength>

The ink compositions prepared in Examples 1 to 3 and Comparative Examples 1 to 8 were inkjet printed to have a thickness of 30 μm on a square-shaped glass having a size of a width of 50 mm, a length of 50 mm, and a thickness of 0.5 mm, UV curing was carried out by irradiating an ultraviolet of 1,000 mJ/cm² or more using a 395 nm UV LED lamp thereon, and then a heat treatment was carried out in an oven at a temperature of 150° C. for 15 minutes, thereby preparing bezel pattern test specimens. And then, the test specimens were subjected to heat treatment in an oven at 220° C. for 15 minutes to prepare bezel pattern specimens, and a surface hardness measurement experiment and an adhesion strength measurement experiment were carried out. And then, the test specimens were subjected to heat treatment in an oven at 200° C. for 30 minutes, and then an evaluation of high-temperature resistance and yellowing was carried out, and the results are shown in Tables 3 and 4.

The surface hardness was measured by using a pencil hardness tester, and measured under the conditions of a thickness angle of 45 degrees and a load of 500 g (standard: ASTM D3363).

For the measurement of adhesion strength, the adhesion strength was evaluated as 0B to 5B by carrying out a cross cut test (standard: ASTM D3359).

Table 3

TABLE 3

|  | Example 1 | Example 2 | Example 3 | Comparative Example 1 | Comparative Example 2 | Comparative Example 3 |
|---|---|---|---|---|---|---|
| Printing thickness (μm) | 27 | 27 | 27 | 30 | 27 | 27 |
| Contrast ratio (%) | 98 | 98 | 98 | 96 | 98 | 98 |
| Surface hardness | 5H | 5H | 5H | 5H |  |  |
| Cross cut | 5B | 5B | 5B | 5B |  |  |
| High-temperature heat resistance (200° C., 30 min) and Yellowing | OK | OK | OK | OK | NG (peeled off) | NG (peeled off) |

Table 4

TABLE 4

|  | Comparative Example 4 | Comparative Example 5 | Comparative Example 6 | Comparative Example 7 | Comparative Example 8 |
|---|---|---|---|---|---|
| Printing thickness (μm) | 27 | 27 | 27 | 30 | 27 |
| Contrast ratio (%) | 98 | 98 | 98 | 98 | 98 |
| Surface hardness | 5H | 2H | 5H | 5H | 5H |
| Cross cut | 0B | 2B | 0B | 5B | 5B |
| High-temperature heat resistance (200° C., 30 min) and Yellowing | OK | OK | OK | NG (yellowing) | NG (yellowing) |

Comparative Example 1 in Table 3 is an ink composition including a white pigment (TiO₂) in an amount of 50 wt % based on the total weight of the dispersion, and when a bezel pattern was formed to have a thickness of 30 μm, the contrast ratio was 96% which failed to satisfy the required level.

Moreover, Comparative Example 2 is an ink composition including a solvent (butyl carbitol acetate), and a phenomenon in which the bezel was peeled off during a heat-temperature heat treatment (200° C., 30 minutes) procedure was observed.

Comparative Example 3 is an ink composition which does not include 2-HEA which is a monofunctional acrylate, and has a problem in that the bezel was peeled off during the high-temperature heat treatment procedure likewise as in Comparative Example 2.

In addition, in Table 4, Comparative Example 4 includes 3 wt % of 2-HEA, so that the bezel was not peeled off during the high-temperature heat treatment procedure, but the adhesion strength was exhibited as 0B.

Comparative Example 5 is an ink composition which does not include PD7610 which is an epoxy resin, and the surface hardness (2H) and the adhesion strength (5B) were reduced, and when KBM-503 was used as an adhesion strength enhancer in Comparative Example 6, the adhesion strength was exhibited as 0B.

In Comparative Examples 7 and 8, Irgacure 184 and Irgacure 907 were used as a photoinitiator, but a yellowing was produced.

In contrast, Table 3 exhibits that the ink compositions including an acrylate monomer (2-HEA) without a solvent in Examples 1 and 2 had excellent bezel performance of a surface hardness of 5H and a cross cut test of 5B, and there were no changes in yellowing and physical properties even after a high-temperature heat treatment was carried out.

Furthermore, a yellowing was not also produced in Example 3 in which the photoinitiator Irgacure 2100 was included.

The invention claimed is:

1. An ultraviolet curable white ink composition for inkjet printing comprising a pigment dispersion, a binder solution, a monofunctional monomer, and a photoinitiator, wherein the ultraviolet curable white ink composition for inkjet printing has, at the time of forming a pattern, a thickness of 30 μm or less and a contrast ratio of 98% or more,
wherein the ultraviolet curable white ink composition is for forming a bezel.

2. The ultraviolet curable white ink composition of claim 1, wherein the ultraviolet curable white ink composition further comprises any one or more selected from the group consisting of an oligomer, a polyfunctional monomer, a polymerization inhibitor, and a surfactant.

3. The ultraviolet curable white ink composition of claim 2, wherein the polyfunctional monomer is dipentaerythritol hexaacrylate (DPHA).

4. The ultraviolet curable white ink composition of claim 2, wherein the monofunctional monomer is comprised in an amount of 1 to 15 wt % based on the total weight of the ink composition.

5. The ultraviolet curable white ink composition of claim 1, wherein the monofunctional monomer has a hydroxy functional group.

6. The ultraviolet curable white ink composition of claim 5, wherein the monofunctional monomer is one or more monomers selected from the group consisting of 2-hydroxyethyl acrylate (2-HEA), hydroxypropyl acrylate (HPMA), 2-hydroxyethyl methacrylate (2-HEMA), and hydroxypropyl methacrylate (HPMA).

7. The ultraviolet curable white ink composition of claim 1, wherein the monofunctional monomer is comprised in an amount of 5 to 25 wt % based on a total weight of the ink composition.

8. The ultraviolet curable white ink composition of claim 1, wherein the pigment dispersion comprises a white pigment, a first reactive monomer, and a dispersing agent.

9. The ultraviolet curable white ink composition of claim 8, wherein the white pigment is titanium dioxide ($TiO_2$).

10. The ultraviolet curable white ink composition of claim 8, wherein the white pigment is comprised in an amount of 55 to 70 wt % based on a total weight of the pigment dispersion.

11. The ultraviolet curable white ink composition of claim 8, wherein the first reactive monomer is a bifunctional acrylate-based monomer.

12. The ultraviolet curable white ink composition of claim 1, wherein the binder solution is composed of an epoxy-based resin and a second reactive monomer.

13. The ultraviolet curable white ink composition of claim 12, wherein the second reactive monomer is a monofunctional acrylate-based monomer.

14. The ultraviolet curable white ink composition of claim 12, wherein the second reactive monomer is comprised in an amount of 60 to 80 wt % based on a total weight of the binder solution.

15. The ultraviolet curable white ink composition of claim 1, wherein the binder solution is comprised in an amount of 1 to 15 wt % based on the total weight of the ink composition.

16. The ultraviolet curable white ink composition of claim 1, wherein the photoinitiator comprises ethyl-2, 4, 6 trimethylbenzoylphenyl phosphinate.

17. The ultraviolet curable white ink composition of claim 1, wherein the photoinitiator is comprised in an amount of 1 to 10 wt % based on the total weight of the ink composition.

18. The ultraviolet curable white ink composition of claim 1, wherein the ultraviolet curable white ink composition has a viscosity of 10 to 50 cP at normal temperature, and has a viscosity of 5 to 20 cP at 60° C.

19. A method for preparing a white bezel pattern using an ultraviolet curable white ink composition for inkjet printing, the method comprising the steps of:

a) preparing a substrate on which a white bezel is formed by inkjet printing the ultraviolet curable white ink composition of claim 1 to have a thickness of 30 μm or less on a substrate;

b) forming a cured white bezel pattern by irradiating an ultraviolet of 1,000 mJ/cm² or more on the substrate; and c) heat-treating the substrate.

20. The method of claim 19, wherein Step c) is a step of heat-treating the substrate on which the bezel is formed under conditions of 150 to 180° C. and 10 to 30 minutes after the ultraviolet curing.

* * * * *